(12) United States Patent
Yu et al.

(10) Patent No.: US 9,455,458 B2
(45) Date of Patent: Sep. 27, 2016

(54) HYDROGEN SUPPLY APPARATUS OF FUEL CELL STACK

(71) Applicant: Hyundai Motor Company, Seoul (KR)

(72) Inventors: Junghan Yu, Gyeonggi-Do (KR); Hyun Suk Choo, Gyeonngi-Do (KR); Se Joon Im, Seoul (KR)

(73) Assignee: Hyundai Motor Company, Seoul (KR)

( * ) Notice: Subject to any disclaimer, the term of this patent is extended or adjusted under 35 U.S.C. 154(b) by 118 days.

(21) Appl. No.: 14/523,572

(22) Filed: Oct. 24, 2014

(65) Prior Publication Data

US 2015/0188164 A1 Jul. 2, 2015

(30) Foreign Application Priority Data

Dec. 30, 2013 (KR) ........................ 10-2013-0167819

(51) Int. Cl.
*H01M 2/38* (2006.01)
*H01M 8/04* (2016.01)
*H01M 8/24* (2016.01)
*H01M 8/10* (2016.01)

(52) U.S. Cl.
CPC ..... *H01M 8/04201* (2013.01); *H01M 8/04089* (2013.01); *H01M 8/04097* (2013.01); *H01M 8/2465* (2013.01); *H01M 2008/1095* (2013.01); *Y02E 60/50* (2013.01)

(58) Field of Classification Search
CPC ................ H01M 2008/1095; H01M 8/04089; H01M 8/04097; H01M 8/04201; H01M 8/2465; Y02E 60/50
See application file for complete search history.

(56) References Cited

U.S. PATENT DOCUMENTS

| | | | |
|---|---|---|---|
| 2006/0046106 A1 | 3/2006 | Yu et al. | |
| 2011/0008695 A1* | 1/2011 | Tejima | H01M 8/0267 429/429 |

FOREIGN PATENT DOCUMENTS

| | | |
|---|---|---|
| JP | 2008-177162 A | 7/2008 |
| KR | 10-2013-0057357 | 5/2013 |

* cited by examiner

*Primary Examiner* — Patrick Ryan
*Assistant Examiner* — Ben Lewis
(74) *Attorney, Agent, or Firm* — Mintz Levin Cohn Ferris Glovsky and Popeo, P.C.; Peter F. Corless

(57) ABSTRACT

A hydrogen supply apparatus of fuel cell stack is provided. In particular, a plurality of unit cells includes a membrane electrode assembly, a separating plate disposed on two sides of the membrane electrode assembly, a coolant path, an air path, a fuel path, and an air inlet manifold communicated with the air path. An end plate is disposed on each end of the plurality of unit cells and forms an air inlet manifold in a location corresponding to the air inlet manifold of the separating plate. Additionally, a hydrogen supply apparatus is provided in the air inlet manifold of the separating plate and the air inlet manifold of the end plate that selectively supplies additional hydrogen to the cathode through the air path when needed.

5 Claims, 10 Drawing Sheets

(a)

(b)

(a)

(b)

(a)

(b)

HYDROGEN SUPPLY APPARATUS OF FUEL CELL STACK

CROSS-REFERENCE TO RELATED APPLICATION

This application claims priority to and the benefit of Korean Patent Application No. 10-2013-0167819 filed in the Korean Intellectual Property Office on Dec. 30, 2013, the entire contents of which are incorporated herein by reference.

BACKGROUND OF THE INVENTION (a) Field of the Invention

The present invention relates to a hydrogen supply apparatus of a fuel cell stack. More particularly, the present invention relates to a hydrogen supply apparatus of a fuel cell stack that temporarily supplies hydrogen to a cathode to improve performance and durability of a fuel cell stack.

(b) Description of the Related Art

As is generally known, a fuel cell system is a type of power generation system that directly converts chemical energy of a fuel to electrical energy. This electrical energy can then be used to provide power to vehicles, electronic devices and any other device that operates off of electricity.

Typically, a fuel cell system includes a fuel cell stack that generates electrical energy, a fuel supply apparatus that supplies fuel (e.g., hydrogen) to the fuel cell stack, an air supply apparatus that supplies oxygen (i.e. air) to the fuel cell stack, and a heat and water management apparatus that disperses reaction heat from the fuel cell stack to the outside and controls operating temperatures of the fuel cell stack.

Fuel cell systems generate electrical power via an electrochemical reaction, and exhaust heat and water that are by-products of the electrochemical reaction.

When a fuel cell stack is applied to a fuel cell vehicle, because of the high power output required, a stack is assembled in which unit cells are continuously and consecutively stacked one on top of the other. A membrane electrode assembly (MEA) is provided to the innermost part of each of the unit cells. This membrane electrode assembly typically includes a polymer electrolyte membrane for transferring protons and a catalyst layer provided on both sides of the polymer electrolyte membrane respectively. Additionally, the catalyst layer includes a cathode and an anode.

A gas diffusion layer (GDL) is also provided on both sides of the membrane electrode assembly respectively along with a separating plate (or separator) within which a flow field is formed. The separating place is typically disposed to abut an outer side of the gas diffusion layer (i.e., the side not in contact with the MEA) This GDL and separator combination are responsible for supplying fuel and air to the cathode and the anode and discharging water generated by the chemical reaction.

Hydrogen and oxygen are ionized by the chemical reaction of each catalyst layer, thus generating an oxidation reaction that generates electrons within a hydrogen portion of the cell and a reduction reaction that generates water within an oxygen portion of the cell. Generally, an electrode catalyst applied to the fuel cell includes a catalyst support made of a carbon material and a catalyst including a platinum catalyst and a co-catalyst (for example, Ru, Co, and Cu).

That is, the hydrogen is supplied to the anode, and the oxygen (air) is supplied to the cathode. Therefore, the hydrogen supplied to the anode is divided into protons (H+) and electrons (e−) by a catalyst of an electrode layer provided at both sides of an electrolyte layer. Only the protons (H+) are selectively transferred to the cathode through the electrolyte layer of the positive ion exchange layer. Simultaneously, the electrons (e−) are transferred to the cathode through the gas diffusion layer and the separating plate.

In the cathode, the protons supplied through the electrolyte layer and the electrons supplied through the separating plate have a chemical reaction with oxygen in the air supplied to the cathode by an air supplying apparatus and generate water. Movement of the protons generates a current, and heat is generated in a water generating reaction.

A starting and stopping operation frequently occurs while driving the fuel cell stack. However, when a high voltage or a reverse voltage is generated in the fuel cell stack, performance of the fuel cell is deteriorated In the case of a fuel cell installed in a vehicle, a load on the fuel cells rapidly changes. Particularly, when the vehicle starts from an idle state, the load is rapidly changed as the vehicle accelerates. When the load changes in this manner during operation, the fuel cell stack has low humidity and the vehicle is in an idle state, a cell voltage rapidly drops and is restored to the initial state. Since mobility of H+ ions can degraded in a dry state, the entire reaction speed is decreased, causing a phenomenon to occur.

Additionally, the catalyst of the fuel cell stack is degraded due to continuous usage of the fuel cell. This results in a deteriorated output performance of the fuel cell.

When the fuel cell is started at low temperatures (i.e., below freezing), such as in winter, heat generated by the electrochemical reaction of hydrogen and oxygen is used to start the fuel cell. However, since an amount of heat and thermal capacity of peripheral components is quite low, the temperature of the fuel cell stack increases slowly when the fuel cell is started at low temperatures. Finally, noise is generated when hydrogen of the fuel cell stack is purged. This noise causes an uneasy feeling to a driver and thus should be avoided if possible.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a hydrogen supply apparatus of fuel cell stack that can prevent Further, the present invention has been made in an effort to provide a hydrogen supply apparatus of a fuel cell stack that prevents a cell voltage drop caused by a rapid load variation during a dry state of a polymer electrolyte membrane.

Further, the present invention has been made in an effort to provide a hydrogen supply apparatus of a fuel cell stack that prevents performance deterioration caused by continuous usage of a fuel cell.

Further, the present invention has been made in an effort to provide a hydrogen supply apparatus of a fuel cell stack that rapidly increases temperature of the fuel cell stack during a cold start.

Finally, the present invention has been made in an effort to provide a hydrogen supply apparatus of a fuel cell stack that eliminates a noise that occurs by a hydrogen purge and solves an uneasy feeling of a driver.

A hydrogen supply apparatus of fuel cell stack according to an exemplary embodiment of the present invention may include: a plurality of unit cells including a membrane electrode assembly including a polymer electrolyte membrane, an anode and a cathode, a separating plate disposed at both sides of the membrane electrode assembly, a coolant path, an air path, a fuel path, and an air inlet manifold communicated with the air path; an end plate disposed at both sides of the plurality of unit cells and forming an air inlet manifold disposed corresponding to the air inlet manifold of the separating plate; and a hydrogen supply apparatus provided in the air inlet manifold of the separating plate and the air inlet manifold of the end plate and selectively supplying hydrogen to the cathode through the air path.

This hydrogen supply apparatus may include: a hydrogen pipe provided in the air inlet manifold of the separating plate and the air inlet manifold of the end plate, and forming a hydrogen outlet; and a supply pipe provided inside or outside of the hydrogen pipe, rotated by driving torque of a motor, and forming a hydrogen supply aperture selectively communicating with the hydrogen outlet of the hydrogen pipe.

In the exemplary embodiment of the present invention, the hydrogen supply aperture may be formed in plural to be arranged with a constant gap in a circumferential direction. A width of the hydrogen outlet and hydrogen supply aperture may be gradually narrowed further away from an inlet through which hydrogen flows in through.

Hydrogen supplied to the cathode may be supplied from a fuel supply unit supplying hydrogen to the anode and/or from a purge line exhausting unreacted hydrogen in the anode.

According to the present invention, since hydrogen is simultaneously supplied to an anode and a cathode during a cold start, formation of a high voltage or reverse voltage can adequately be prevented. Further, since a polymer electrolyte membrane is not dry, a cell voltage drop can be prevented. Even further, since hydrogen adequately is supplied to a cathode, it is possible to recover deteriorated performance of catalyst.

Also, since hydrogen is supplied to a cathode during a cold start, the temperature of fuel cell stack is rapidly increased due a chemical reaction between hydrogen and oxygen in a platinum catalyst of a cathode. As such, the fuel cells will be warmed up faster. Finally, since purge hydrogen of a fuel cell is resupplied to a cathode, noise occurring during a hydrogen purge process is reduced and then an uneasy feeling of a driver can be solved.

DETAILED DESCRIPTION OF THE EMBODIMENTS

Figure 1:
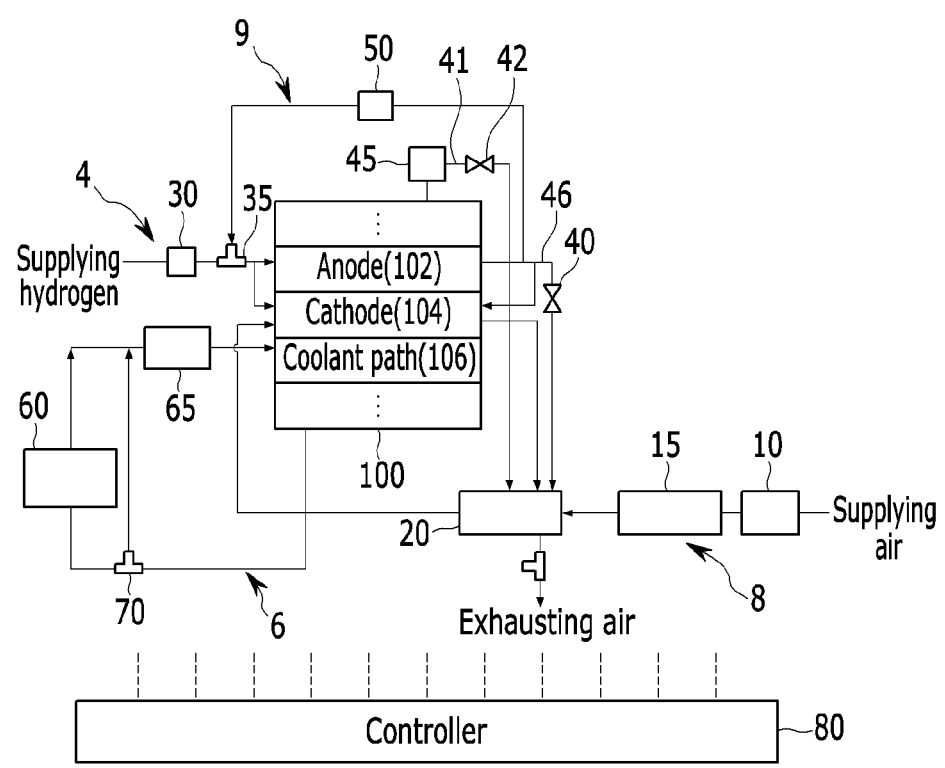
FIG. 1 is a schematic diagram of a fuel cell system according to an exemplary embodiment of the present invention.

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes fuel cell vehicles, hybrid fuel cell vehicles, electric fuel cell vehicles, plug-in hybrid fuel cell electric vehicles, hydrogen-powered fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

A fuel cell system according to the exemplary embodiment of the present invention is provided in a fuel cell vehicle. The fuel cell system includes an electrical generating system that is configured to generate electrical energy via an electrochemical reaction between fuel and an oxidizer which are reaction sources.

When the fuel cell system is configured with a direct oxidation fuel cell, the fuel may include an alcoholic liquid fuel such as methanol and ethanol. The fuel may alternatively include a liquefied gas fuel of a hydrocarbon-group material including methane, ethane, propane, and butane.

When the fuel cell system is configured with a polymer electrolyte membrane fuel cell, the fuel may include a reformed gas including hydrogen generated from the liquid fuel or a liquefied gas fuel. The reformed gas may be generated with a reformer.

However, for convenience and for exemplary purposes, the fuel will now be referred to herein as hydrogen in the specification, however the term fuel should not be limited as such. Further, the oxidizer may be oxygen gas stored in an additional storage tank, or natural air. For convenience and for exemplary purposes, however, the oxidizer will now be referred to herein as air, however the term fuel should not be limited as such.

FIG. 1 is a schematic diagram of a fuel cell system according to an exemplary embodiment of the present invention. As shown in FIG. 1, a fuel cell system according to an exemplary embodiment of the present invention includes a fuel cell stack 100 that is configured to generate electrical energy, a fuel supply unit 4 that is connected to the supply hydrogen to the fuel cell stack 100, an air supply unit 8 that his connected to supply air to the fuel cell stack 100, a heat and water management unit 6 that is connected to discharge heat from a reaction in the fuel cell stack to an outside environment, configured to control an operating temperature of the fuel cell stack 100, and manage water, and a controller 80 configured to control the constituent elements of the fuel cell system.

The fuel supply unit 4 includes a hydrogen tank, a proportional control valve 30, and a hydrogen recirculating unit 9. The air supply unit 8 includes an air blower 15 and a humidifier 20. The heat and water management unit 6 includes a coolant pump 65 and a radiator 60.

High pressure hydrogen that is supplied from the hydrogen tank is supplied to the fuel cell stack with a lower pressure via the proportional control valve 30. Unreacted hydrogen is recirculated to the anode and cathode by providing a recirculating blower in a recirculating line of the hydrogen recirculating unit 9. The radiator 60 adjusts temperature of coolant flowing into the fuel cell stack 100. The coolant passing through the radiator 60 is cooled by heat exchange, and the coolant is supplied to the fuel cell stack 100. The controller 80 controls each constituent element of the fuel cell system, and controls hydrogen and oxygen supplied to the anode and the cathode. Thereby, electrical energy is generated.

Figure 2:
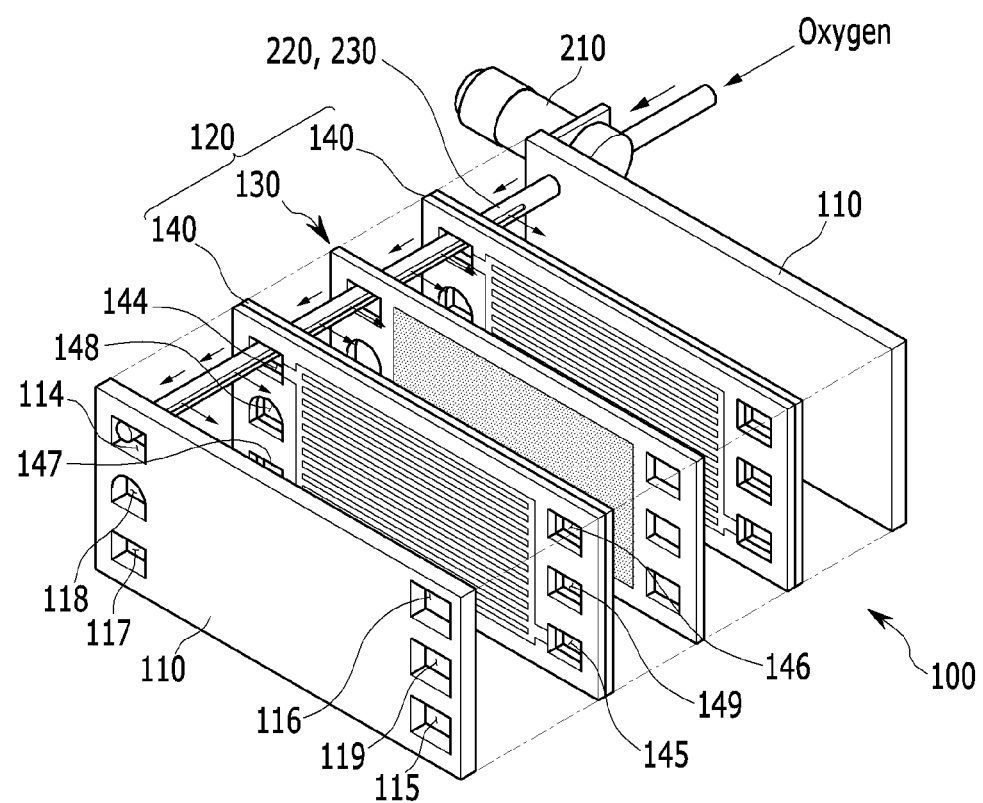
FIG. 2 is a schematic diagram illustrating a hydrogen supply apparatus of a fuel cell stack according to an exemplary embodiment of the present invention.
Figure 3:
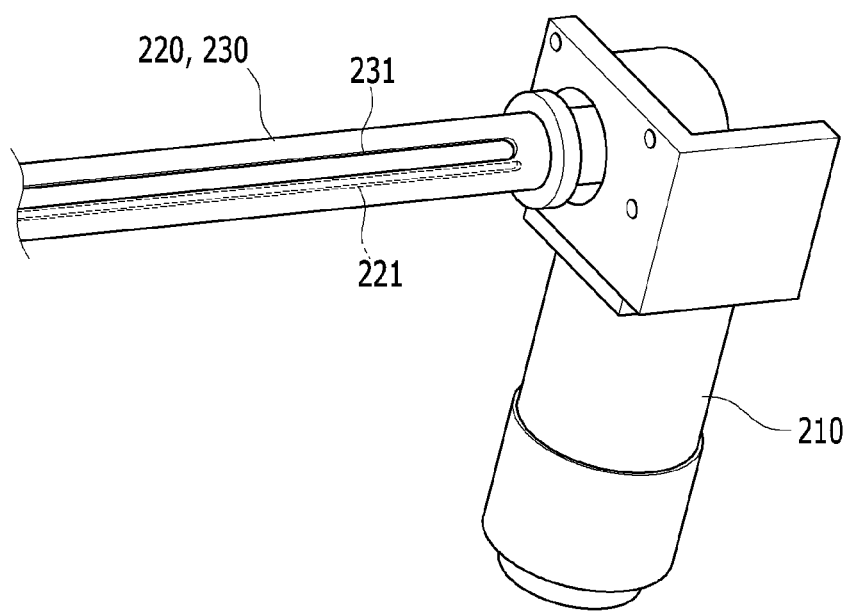
FIG. 3 is a partially enlarged view illustrating a hydrogen supply apparatus of a fuel cell stack according to an exemplary embodiment of the present invention.

FIG. 2 is a schematic diagram illustrating a hydrogen supply apparatus of fuel cell stack according to an exemplary embodiment of the present invention. For convenience, one unit cell is shown in FIG. 2. As shown in FIG. 2, the fuel cell stack includes a plurality of unit cells 120. Each unit cell 120 generates electrical energy by electrochemical reaction between hydrogen and air.

The fuel cell stack is assembled by pressing and engaging the plurality of unit cells 120 together. An end plate 110 is engaged at both sides of the plurality of unit cells 120 by engaging means. Therefore, the end plate 110 is closely attached to the plurality of unit cells 120 while a predetermined pressure is applied to the plurality of unit cells 120.

Each unit cell 120 includes a membrane electrode assembly (MEA) 130 and two separating plates (separators) 140 provided on respective sides of the membrane electrode assembly 130. The membrane electrode assembly 130 includes a polymer electrolyte membrane to move protons, and a catalyst layer provided at respective sides of the polymer electrolyte membrane so that hydrogen and oxygen can react, that is, an anode and a cathode are disposed on respective sides of the polymer electrolyte membrane.

A gas diffusion layer (GDL) is also disposed on both sides of the membrane electrode assembly 130. A separating plate 140 with flow fields through which reaction hydrogen and oxygen are supplied to the anode and the cathode and water generated by the reaction is exhausted is disposed on an outer side of the GDL.

The anode divides the provided hydrogen into electrons and protons, and the polymer electrolyte membrane moves the protons toward the cathode.

The cathode reacts with the electrons and the protons transmitted from the anode and separately provided oxygen transmitted from the flow field of the separating plate 140 to generate water and heat.

Some water generated from the cathode is moved toward the anode through the polymer electrolyte membrane. When water that is moved to the anode remains in the catalyst layer, a catalyst reaction amount is reduced. When water that is moved to the anode stays in the flow field, the water blocks a hydrogen supply path. Therefore, a water trap 45 that exhausts water remaining in the catalyst layer or the flow field is connected to the anode, and a purge line 46 that exhausts impurities to the humidifier is connected to the anode.

A water exhaust line 41 that exhausts water to the humidifier is connected to the water trap 45, and an exhaust valve 42 that opens for each of predetermined time periods and exhausts water is provided in the water exhaust line 41. Further, a purge valve 40 is provided in the purge line 46 so that hydrogen in the anode is exhausted for every purge period. Therefore, impurities such as water and nitrogen of the separating plates 140 are exhausted and eliminated, such that hydrogen usage increases.

As shown in FIG. 2, one side of the separating plate 140 faces the anode or the cathode, and the other side of the separating plate 140 faces the separating plate 140 of another unit cell 120. A fuel path is formed at one side of the separating plate 140 facing the anode, and an air path is formed at the other side of the separating plate 140 facing the cathode. A coolant path for circulating coolant is formed inside of the separating plate 140.

A fuel inlet manifold 144 supplying hydrogen to the anode and a fuel outlet manifold 145 exhausting unreacted hydrogen are formed in the separating plate 140. An air inlet manifold 146 supplying air to the cathode and an air outlet manifold 147 exhausting unreacted air are formed in the separating plate 140. A coolant inlet manifold 148 supplying coolant to the unit cell 120 and a coolant outlet manifold 149 exhausting coolant are formed in the separating plate 140.

A fuel inlet manifold 114 and fuel outlet manifold 115 respectively communicating with the fuel inlet manifold 144 and the fuel outlet manifold 145 of the separating plate 140 are formed in the end plate 110. An air inlet manifold 116 and an air outlet manifold 117 respectively communicating with the air inlet manifold 146 and the air outlet manifold 147 of the separating plate 140 are formed in the end plate 110. A coolant inlet manifold 118 and a coolant outlet manifold 119 respectively communicating with the coolant inlet manifold 148 and the coolant outlet manifold 149 of the separating plate 140 are formed in the end plate 110.

A hydrogen pipe 220 is provided to penetrate into the air inlet manifold 116 of the end plate 110 and the air inlet manifold 146 of the separating plate 140. A hydrogen outlet 221 is formed in the hydrogen pipe 220. The hydrogen outlet 221 may extend in a length direction of the hydrogen pipe 220 and have a slot shape.

A supply pipe 230 is provided outside of the hydrogen pipe 220. The supply pipe 230 rotates by driving torque of a motor 210, and a hydrogen supply aperture 231 that selectively communicates with the hydrogen outlet 221 of the hydrogen pipe 220 is provided. The hydrogen supply aperture 231 is formed with a shape corresponding to the hydrogen outlet 221. Since the supply pipe 230 rotates by driving torque of the motor 201, the hydrogen supply aperture 231 selectively communicates with the hydrogen outlet 221. The hydrogen pipe 220 may be connected to the purge line 46 that exhausts unreacted hydrogen in the anode and/or the fuel supply unit 4.

Figure 4:
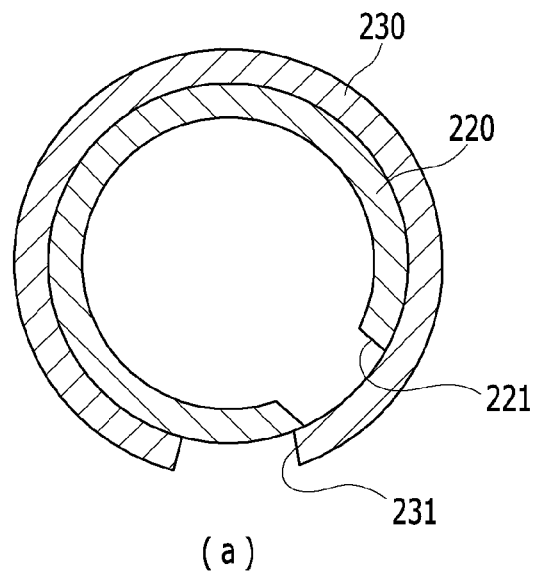
FIG. 4 is a cross-sectional view illustrating a hydrogen pipe and a supply pipe according to an exemplary embodiment of the present invention.
Figure 4:
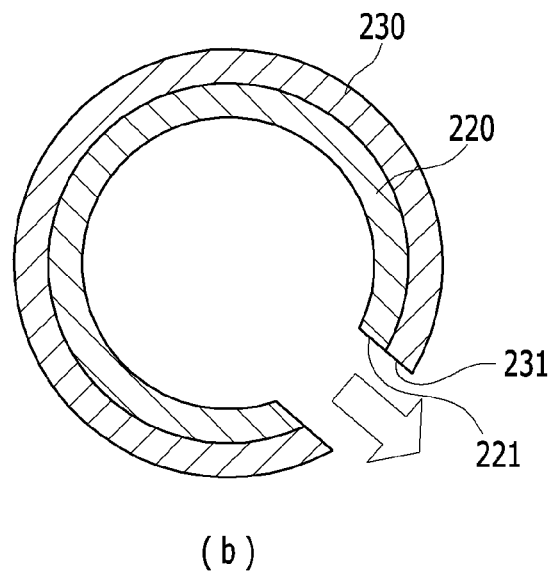

As shown in FIG. 4, when the supply pipe 230 rotates by driving torque of the motor 210 to a first position and then the hydrogen outlet 221 does not communicate with the hydrogen supply aperture 231 (refer to FIG. 4 (a)), hydrogen in the hydrogen pipe 220 is prevented from flowing into the air inlet manifold 146. However, when the supply pipe 230 rotates by driving torque of the motor 210 and then the hydrogen outlet 221 communicates with the hydrogen supply aperture 231 (refer to FIG. 4 (b)), hydrogen in the hydrogen pipe 220 flows into the cathode through the air inlet manifold 146.

Figure 5:
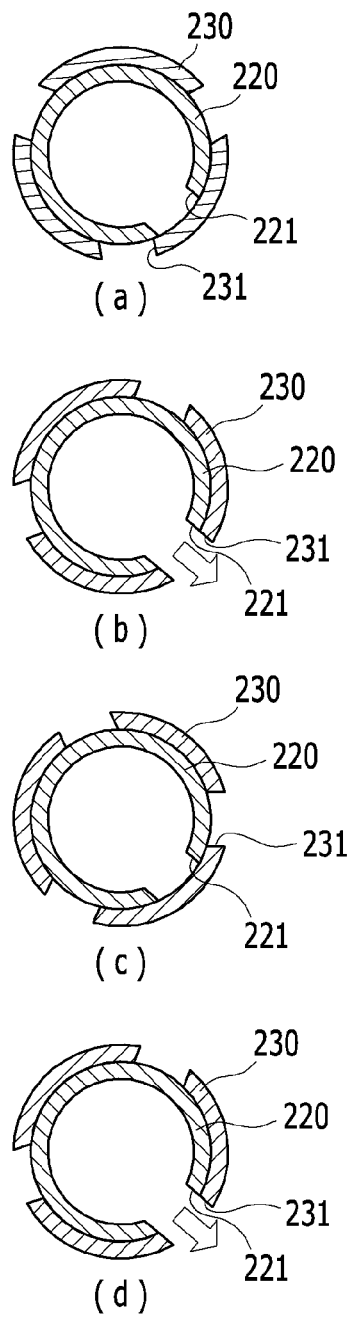
FIG. 5 is a cross-sectional view illustrating a hydrogen pipe and a supply pipe according to another exemplary embodiment of the present invention.

As shown in FIG. 5, a plurality of hydrogen supply apertures 231 may be formed along a circumferential direction of the supply pipe 230. When a plurality of hydrogen supply apertures 231 are formed along the supply pipe 230, hydrogen in the hydrogen pipe 220 can be supplied in a pulsing manner via rotation of the supply pipe 230. That is, compared to the embodiment of FIG. 4, this embodiment efficiently controls the supply speed and the supply amount of hydrogen to the cathode.

Figure 6:
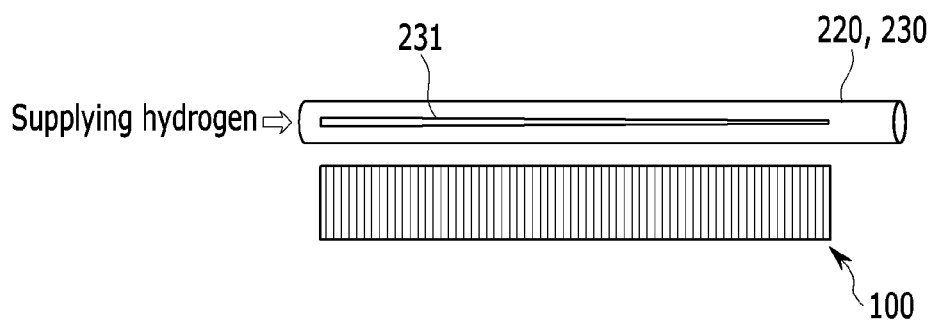
FIG. 6 is a schematic view illustrating a hydrogen pipe, a supply pipe, and a fuel cell stack according to another exemplary embodiment of the present invention.

FIG. 6 is a schematic view illustrating a hydrogen pipe, a supply pipe, and a fuel cell stack according to another exemplary embodiment of the present invention. Generally, it is difficult to uniformly supply hydrogen to unit cells 120 further away from the inlet for hydrogen due to an amount of hydrogen flowing through the hydrogen pipe 220. Therefore, as shown in FIG. 6, it is preferable that a width of the hydrogen outlet 221 is gradually narrowed further away from a portion where hydrogen flows therein.

Figure 7:
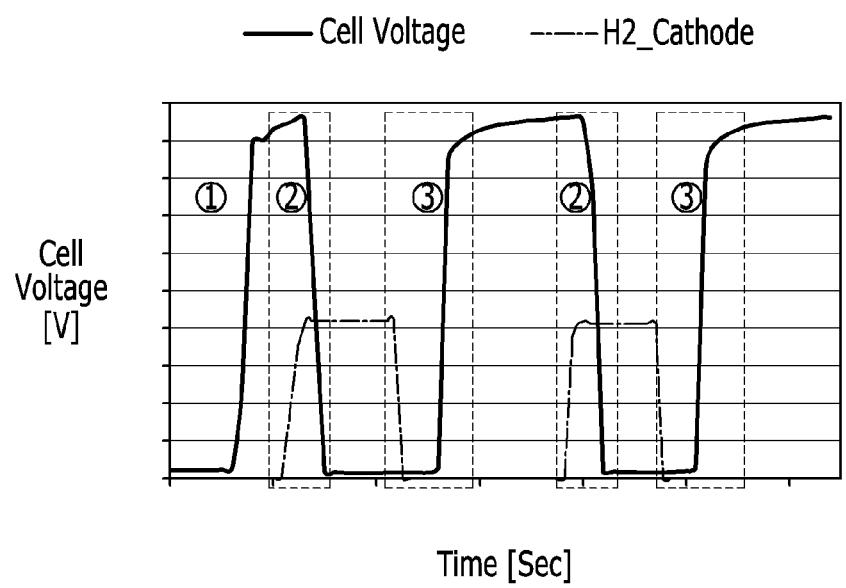
FIG. 7 is a graph illustrating a relationship between hydrogen supplied to a cathode and cell voltage.

As such, when the width of the hydrogen outlet 221 is gradually decreased further away from a portion where hydrogen flows therein, as shown in FIG. 7, an opening formed by the hydrogen outlet 221 and the hydrogen supply aperture 231 adjacent to the portion where hydrogen flows therein is relatively large (refer to FIG. 7 (a)). Further the opening the hydrogen outlet 221 and the hydrogen supply aperture 231 far away from the portion where hydrogen flows therein is relatively small (refer to FIG. 7 (b)). Therefore, hydrogen is uniformly supplied to the cathode of each unit cell 120.

According to an exemplary embodiment of the present invention, hydrogen is not always supplied to the cathode through the air inlet manifold 146, but instead hydrogen is supplied to the cathode when a special situation, to be described later, occurs.

When starting and stopping operation of the fuel cell is frequently performed, a high voltage or a reverse voltage of the fuel cell stack may be formed. At this time, hydrogen is supplied to the cathode through the hydrogen pipe 220, such that forming of the high voltage can be prevented.

FIG. 7 is a graph illustrating a relationship between hydrogen supplied to the cathode and cell voltage. In FIG. 7, a solid line shows cell voltage, and a dashed line shows hydrogen supplied to the cathode. Specifically, as shown in FIG. 7, cell voltage of the fuel cell stack is a high voltage (refer to (1) of FIG. 7) in a low load condition. Further, when hydrogen is supplied to the cathode, the cell voltage drops (refer to refer to (2) of FIG. 7), and when hydrogen is not supplied to the cathode, the cell voltage increases (refer to refer to (3) of FIG. 7).

Figure 8:
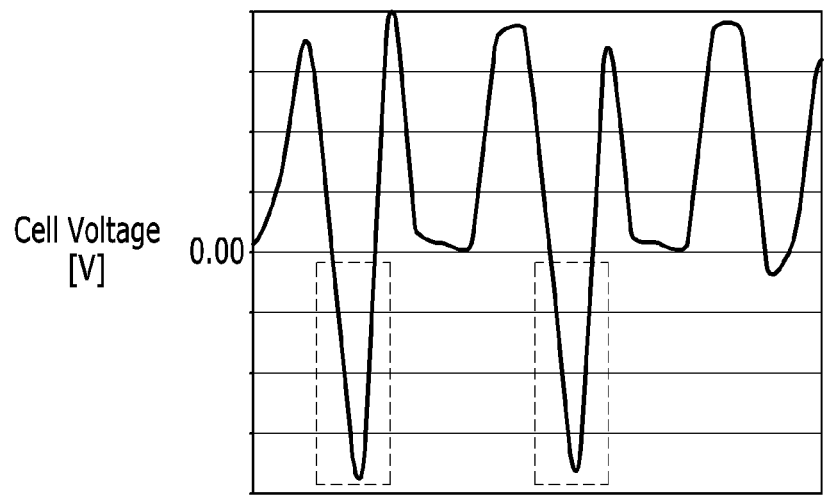
FIG. 8 is a graph illustrating cell voltage when a fuel cell is started.
Figure 8:

FIG. 8 is a graph illustrating the cell voltage when the fuel cell is started. As shown in FIG. 8, when hydrogen is supplied only to the cathode, a reverse voltage is formed (refer to FIG. 8 (a)), and when hydrogen is supplied to the cathode and the anode, formation of the reverse voltage can be prevented (refer to FIG. 8 (b)).

Figure 9:
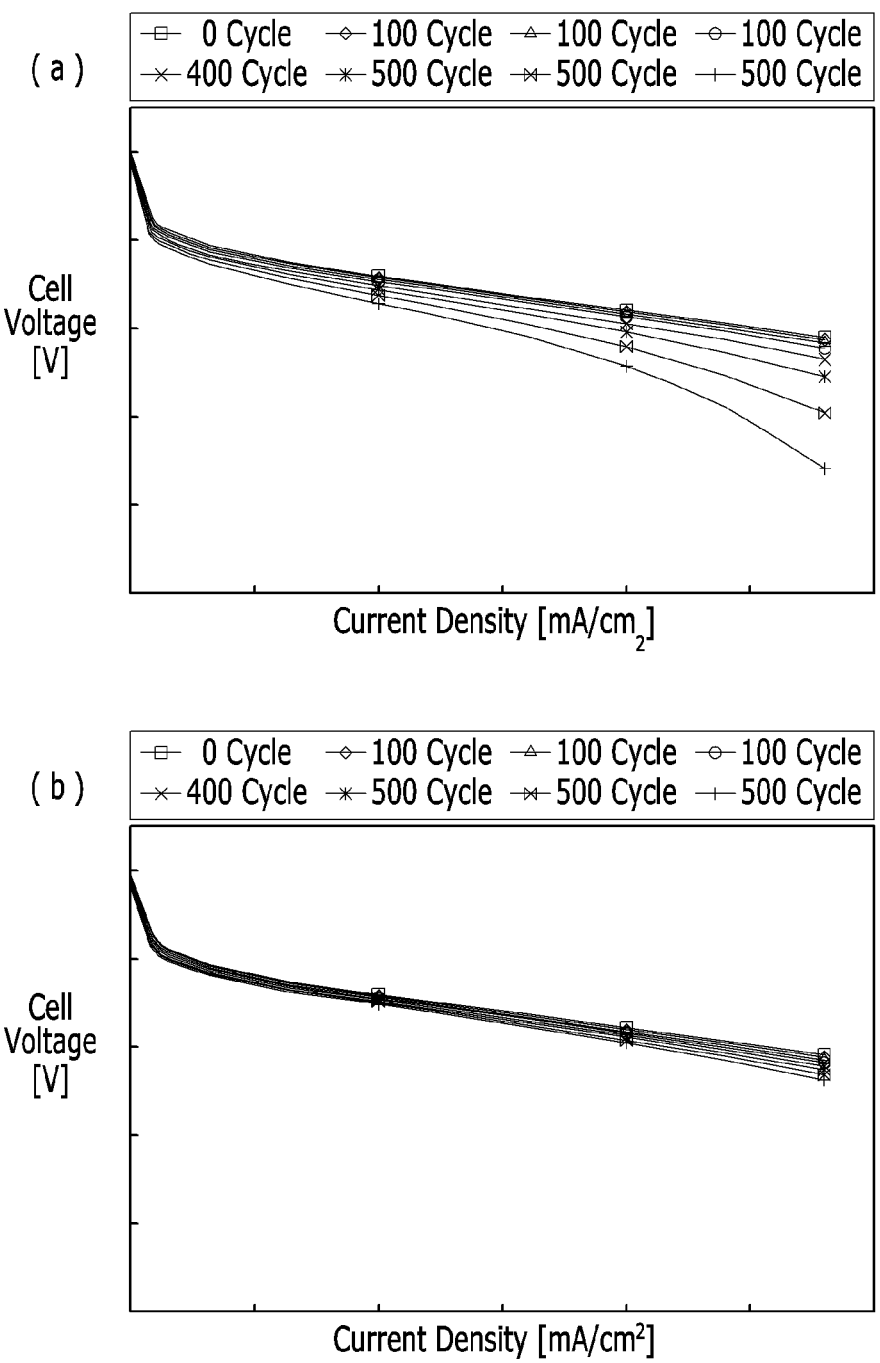
FIG. 9 is a graph illustrating a relationship between current density and cell voltage.

As described above, when a high voltage or a reverse voltage is formed in the fuel cell, a catalyst and a catalyst support is degraded and performance of the fuel cell is deteriorated. As shown in FIG. 9, when hydrogen is supplied to the cathode, the cell voltage of the fuel cell can be maintained constant (refer to FIG. 9 (b)), compared to not supplying hydrogen to the cathode (refer to FIG. 9 (a)). Therefore, deterioration of performance of the fuel cell can be prevented.

Figure 10:
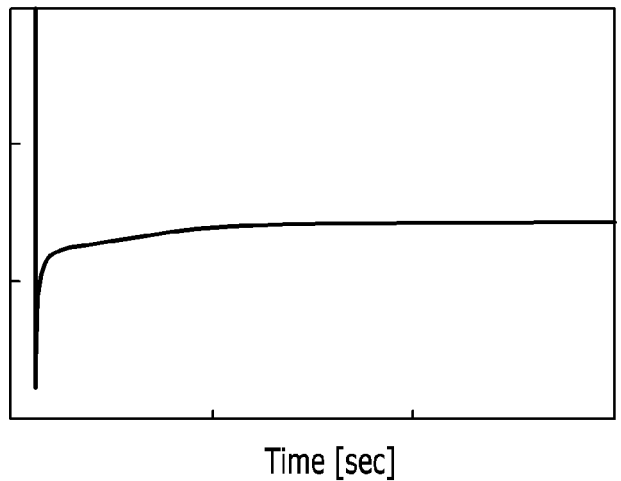
FIG. 10 is a graph illustrating cell voltage when a fuel cell starts in an idle state.
Figure 10:
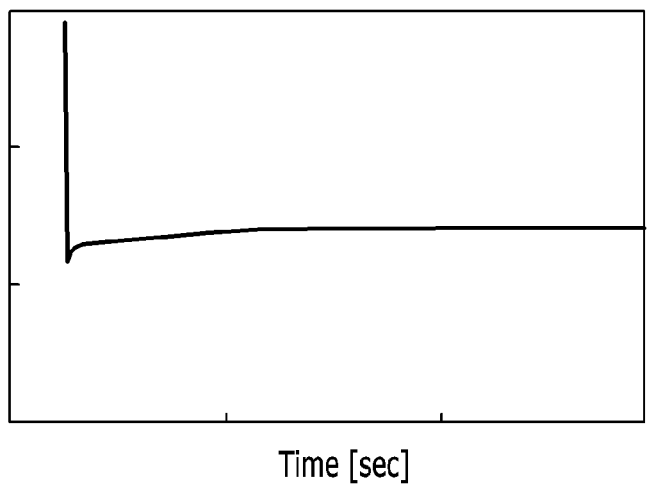

Next, when a vehicle with the fuel cell starts from an idle state and a load is rapidly changed, hydrogen is again supplied to the cathode. When the vehicle with the fuel cell starts from the idle state, as shown in FIG. 10 (a), the cell voltage suddenly drops and then increases by a rapid change of the load.

However, when the vehicle with the fuel cell starts from an idle state and then hydrogen is supplied to the cathode, the polymer electrolyte membrane is prevented from drying by water generated by the chemical reaction between hydrogen and oxygen. Therefore, a sudden drop of the cell voltage can be prevented (refer to FIG. 10 (b)).

Further, when the catalyst of the fuel cell stack is degraded by continuous usage of the fuel cell and recovery of performance of the fuel cell is needed, hydrogen is supplied to the cathode.

When hydrogen is supplied to the cathode, hydrogen supplied to the cathode is diffused to the anode. Simultaneously, an oxygen reduction reaction (ORR) becomes active through reduction of platinum oxide of the cathode. Therefore, since hydrogen is supplied to the cathode of the fuel cell stack of which performance is deteriorated, performance of the fuel cell is recovered.

In addition, when hydrogen is supplied to the cathode during a cold start, heat is generated by the chemical reaction between hydrogen and oxygen in the platinum catalyst of the cathode, such that the temperature of the fuel cell stack rapidly increases.

Further, when hydrogen is resupplied to the cathode by using purge hydrogen generated from the anode, noise occurring during the hydrogen purge process is reduced and thus the uneasy feeling of a driver can be solved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

100: fuel cell stack
110: end plate
120: unit cell
130: membrane electrode assembly
140: separating plate
144: fuel inlet manifold
145: fuel outlet manifold 146: air inlet manifold
147: air outlet manifold
148: coolant inlet manifold
149: coolant outlet manifold
210: motor
220: hydrogen pipe
221: hydrogen outlet
230: supply pipe
231: hydrogen supply aperture While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hydrogen supply apparatus of fuel cell stack comprising:
    a plurality of unit cells, each unit cell of the plurality of unit cells comprising a membrane electrode assembly, a separating plate disposed on two sides of the membrane electrode assembly, a coolant path, an air path, a fuel path, and an air inlet manifold communicated with the air path;
    an end plate disposed on each end of the plurality of unit cells, the end plate forming an air inlet manifold disposed corresponding to the air inlet manifold of the separating plate; and
    a hydrogen supply apparatus provided in the air inlet manifold of the separating plate and the air inlet manifold of the end plate, the hydrogen supply apparatus selectively supplying hydrogen to the cathode through the air path,
    wherein the hydrogen supply apparatus includes:
    a hydrogen pipe provided in the air inlet manifold of the separating plate and the air inlet manifold of the end plate, and forming a hydrogen outlet; and
    a supply pipe provided inside or outside of the hydrogen pipe, connected to be rotated by driving torque of a motor, and forming a hydrogen supply aperture selectively communicating with the hydrogen outlet of the hydrogen pipe.

2. The hydrogen supply apparatus of fuel cell stack of claim 1,
    wherein a plurality of hydrogen supply apertures are arranged so as to have a constant gap in a circumferential direction.

3. The hydrogen supply apparatus of fuel cell stack of claim 1,
    wherein a width of the hydrogen outlet and hydrogen supply aperture is gradually narrowed further away from an inlet through which hydrogen flows therein.

4. The hydrogen supply apparatus of fuel cell stack of claim 1,
    wherein hydrogen supplied to the cathode is supplied from a fuel supply unit connected to supply hydrogen to the anode.

5. The hydrogen supply apparatus of fuel cell stack of claim 1,
    wherein hydrogen supplied to the cathode is supplied from a purge line connected to exhaust unreacted hydrogen in the anode.

* * * * *